United States Patent
Saharan, III et al.

(10) Patent No.: US 11,253,915 B2
(45) Date of Patent: Feb. 22, 2022

(54) VIBRATIONAL DENSIFICATION OF POWDER SUPPLY IN ADDITIVE MANUFACTURING

(71) Applicant: EOS GmbH Electro Optical Systems, Krailling (DE)

(72) Inventors: Ankit Saharan, III, Krailling (DE); Erling Richard LaSalle, Krailling (DE)

(73) Assignee: EOS GmbH Electro Optical Systems, Krailling (DE)

( * ) Notice: Subject to any disclaimer, the term of this patent is extended or adjusted under 35 U.S.C. 154(b) by 462 days.

(21) Appl. No.: 15/683,353

(22) Filed: Aug. 22, 2017

(65) Prior Publication Data

US 2018/0056387 A1    Mar. 1, 2018

Related U.S. Application Data

(60) Provisional application No. 62/379,477, filed on Aug. 25, 2016.

(51) Int. Cl.
| | |
|---|---|
| *B22F 3/093* | (2006.01) |
| *B33Y 30/00* | (2015.01) |
| *B33Y 40/00* | (2020.01) |
| *B33Y 10/00* | (2015.01) |
| *B22F 3/00* | (2021.01) |
| *B29C 64/205* | (2017.01) |

(Continued)

(52) U.S. Cl.
CPC .............. *B22F 3/093* (2013.01); *B22F 3/004* (2013.01); *B29C 64/205* (2017.08); *B33Y 10/00* (2014.12); *B33Y 30/00* (2014.12); *B33Y 40/00* (2014.12); *B22F 10/10* (2021.01); *B22F 12/00* (2021.01); *B22F 2999/00* (2013.01); *B29C 64/153* (2017.08); *Y02P 10/25* (2015.11)

(58) Field of Classification Search
CPC .............. B22F 2003/1056; B22F 3/004; B22F 2202/01; B22F 3/093; B22F 3/1055; B29C 64/153; B29C 64/205; B33Y 10/00; B33Y 30/00; B33Y 40/00
See application file for complete search history.

(56) References Cited

U.S. PATENT DOCUMENTS 2,118,182 A  *  6/1935  Flint
5,250,255 A  *  10/1993  Sagawa .................. B22F 3/003
                                                                    419/38

(Continued)

FOREIGN PATENT DOCUMENTS

CN          201880504      *  6/2011
WO       WO2015197426   *  12/2015

*Primary Examiner* — Nicholas A Wang
(74) *Attorney, Agent, or Firm* — Seyfarth Shaw LLP (57) ABSTRACT

Disclosed are an apparatus and method for densifying or compacting powder material in the supply bin of an additive manufacture machine to improve the quality of the object being made. For example, a removable or portable apparatus can be applied to the surface of the supply bin once the bin has been filled. The apparatus can include a vibrational component that agitates the underlying powder to compact the material. The apparatus can then be removed during the remainder of the additive manufacturing process, which then follows in its normal course. A vacuum can also be used the remove of air or other gases that are emitted during the compaction process, for example, as voids are filled during densification.

12 Claims, 11 Drawing Sheets

(51) Int. Cl.
  *B29C 64/153* (2017.01)
  *B22F 12/00* (2021.01)
  *B22F 10/10* (2021.01)

(56) References Cited

U.S. PATENT DOCUMENTS

2005/0281701 A1* 12/2005 Lynch .................. B22F 3/22
                                             419/10
2008/0310989 A1* 12/2008 Tschofen .............. B22F 3/04
                                             419/17
2012/0107438 A1*  5/2012 Bokodi ............. B01F 7/00158
                                             425/200
2016/0348329 A1* 12/2016 Takeshima et al.
2017/0144372 A1*  5/2017 Kuesters .............. B22F 3/1055

* cited by examiner

VIBRATIONAL DENSIFICATION OF POWDER SUPPLY IN ADDITIVE MANUFACTURING

TECHNICAL FIELD OF THE INVENTION

The invention relates to an apparatus and method for use in densifying, or compacting, a powder supply in a layer-wise manufacture of a three-dimensional object.

BACKGROUND OF THE DISCLOSURE

More and more, additive manufacturing machines and methods are used not only for the making of prototypes, but for the manufacture of usable products, whether in small series manufacture or in the production of large volume commercial parts. A very important aspect in the production is the manufacturing time, as well as the quality of the part produced. A "finer" detail finished object yields a better quality, particularly in additive manufacture using powder build material. However, usually a manufacturing time that is as short as possible is at the expense of object details that are as small as possible.

Additive manufacturing, sometimes referred to shorthand as "3D printing," is now well known in general concept and execution. In a layer-wise process, synergistic stimulation (e.g., laser energy), is applied to a build surface of appropriate powder material according to software which has taken a three-dimensional object via computer-aided design (CAD) software and reduced it to planar "slices". The software drives the laser (e.g., a laser source combined with a scanner), which then operates to selectively (i.e. in a locally selective way) fuse (melting, or sometimes referred to as "sintering") a layer at a time, to thereby build up the object. U.S. Pat. No. 8,845,319 discloses a machine and method, just for one example, in which the surface regions of an object are solidified by means of a laser beam.

Build material (e.g., powder material) is typically provided to a powder supply bin, located on a lateral side of the build area (in which the object will be formed). A wiper, doctor blade or other similar device sweeps the material from the supply bin over the build area, to provide each new layer to be fused, as upon the one below. The finer or denser the new layer is, the better detail of the resulting object.

SUMMARY OF THE DISCLOSURE

It is a principal object of the present invention to provide an apparatus and method for densifying, or compacting, the powder material in the supply bin of an additive manufacture machine and process, to thereby improve the quality of the object being made and/or to make the additive manufacturing process more robust and/or more effective. In one preferred form, the invention is a removable or portable apparatus which is applied to the surface or the inner side of the supply bin once the bin has been filled, or at least partially filled; in the latter case, the bin can be filled in a stepwise manner, i.e. involving more than just one step of filling the supply bin with powder but rather several substeps of filling part of the overall powder amount with more than one compaction or densification step in between. The apparatus has a vibrational component which agitates the underlying powder, causing the material to become more compacted. The apparatus is then removed for the additive manufacture process which then follows in its normal course. A vacuum or suction is furthermore advantageously applied during operation of the apparatus, to facilitate the removal of air or other gases which are outgassed during the compaction process (as previous voids are filled in densification).

BRIEF DESCRIPTION OF THE DRAWINGS

These above advantages and other advantages and objects of the present disclosure will be made further apparent upon consideration of the following exemplary description, taken in conjunction with the drawings, in which.

DETAILED DESCRIPTION OF THE EMBODIMENTS

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

Figure 1:
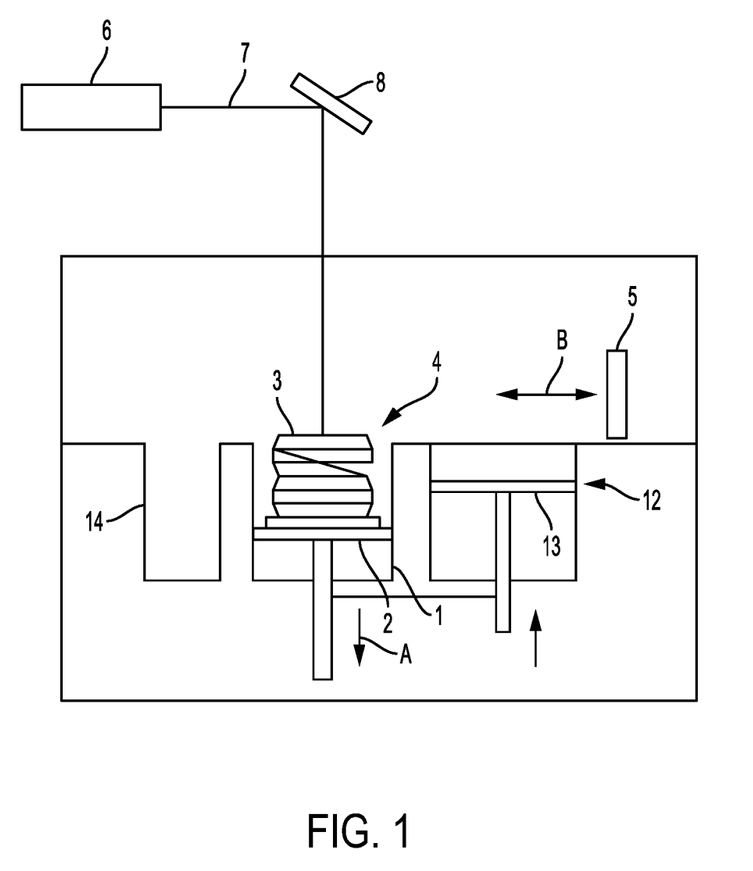
FIG. 1 schematically shows a laser sintering machine as an example of an apparatus for a layer-wise manufacturing of a three-dimensional object by means of an additive manufacturing method, and for which this invention would be advantageously applied.

FIG. 1 shows a laser sintering apparatus as an exemplary embodiment of an apparatus in the context of an aspect of the invention. The laser sintering apparatus comprises a container or build chamber 1 that is open towards the top. A support 2 for carrying the object 3 to be built is provided in the build chamber 1. The support 2 can be moved up and down (typically downwardly in building an object) in vertical direction A in the build chamber 1 by means of a suitable drive. The upper edge of the container 1 defines a working plane 4. Above the working plane 4, an irradiation assembly 6, which may typically emit a directed laser beam 7 deflected onto the working plane 4 through a deflection device or scanner 8, is arranged so as to strike the working plane 4 of the build chamber to thereby form layers in the buildup of an object in very well-known fashion.

A layering or coating device 5 is provided for applying a layer of a powder building material to be solidified onto the surface of the support 2 or onto the last layer that has been solidified before. The coating device 5, which may be a wiper, doctor blade, roller or the like, can be moved back and forth across the working plane 4 by means of a drive schematically indicated by the arrows B. A powder supply bin or container 12 is shown at one lateral side of the build chamber 1. Powder to be used in the build process is deposited in the supply bin 12, which has its own support 13 that is driven in synchronization with the support 2, to place powder in a position to then be spread as a fresh layer by the coating device 5. On the opposite side of the build chamber 1 is a powder overflow bin or container 14 into which excess powder not used in the layer is swept by the coating device 5. The working area is secluded from the environment by means of a process chamber. All powders and powder mixtures, respectively, that are suitable for a laser sintering process, may be used as building material in powder form. Such powders include e.g. plastic powders such as (amongst others well-known to the trade) polyamide or polystyrene, PEEK, metal powders such as stainless steel powder or other metal powders adapted to the respective purpose, in particular alloys, plastic-coated sand or ceramics powder.

As noted, the laser sintering apparatus is operated such that the application device 5 moves across the construction field and applies a powder layer having a predetermined thickness d, which thickness need not be the same for all layers, in the whole construction field. Subsequently, the cross-section of the object 3 in the respective layer is irradiated with the laser beam in the working plane 4 and the powder there is solidified. Then the support 2 is lowered and a new powder layer is applied. In this way the object 3 is manufactured layer by layer. After the completion of the object 3, the same is removed and if necessary is after-treated by, e.g., milling and/or being subjected to a quality control. In an additive manufacturing method such as a laser sintering method, in which objects are manufactured layer-wise from a building material, at first a CAD model of the object to be manufactured exists. Such a CAD model is cut into layers (so-called slicing) that correspond to the layers of the building material to be solidified. These data (also called "production data"), which contain the structure information on the object, are processed by the control unit for the manufacturing of the object.

Figure 2:
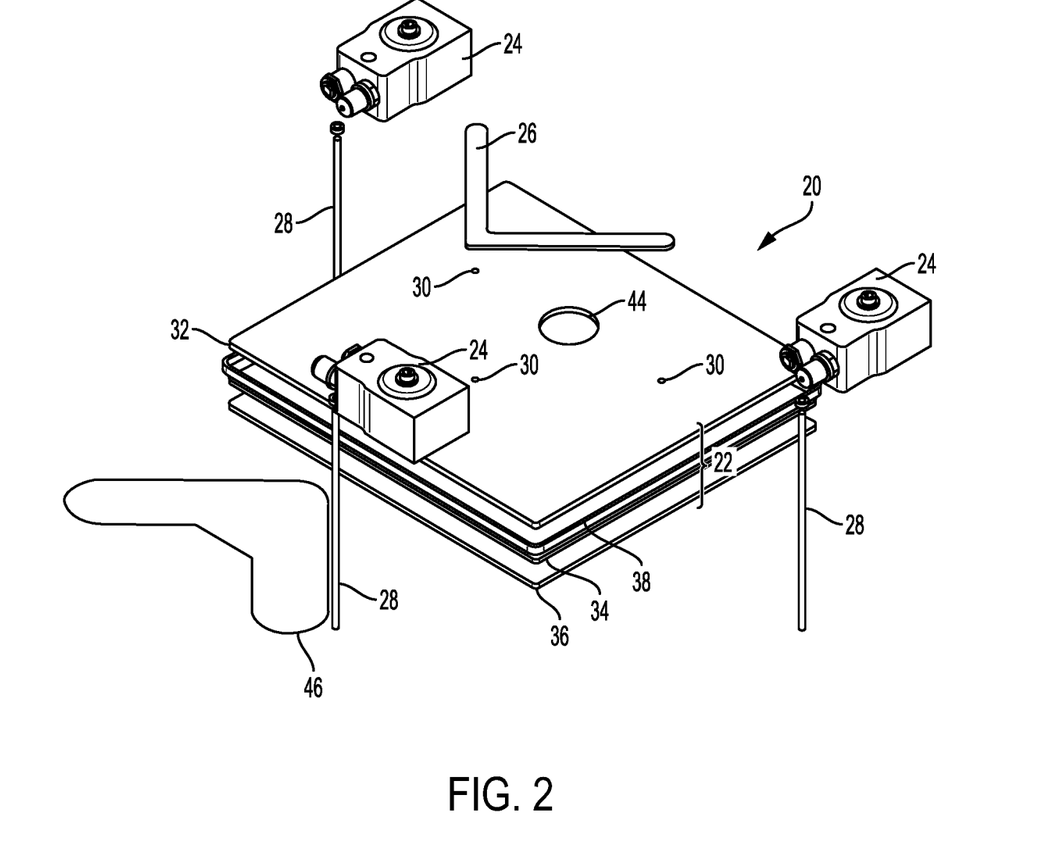
FIG. 2 is a somewhat exploded perspective view of a vacuum packing apparatus made in accordance with an aspect of the invention.
Figure 3:
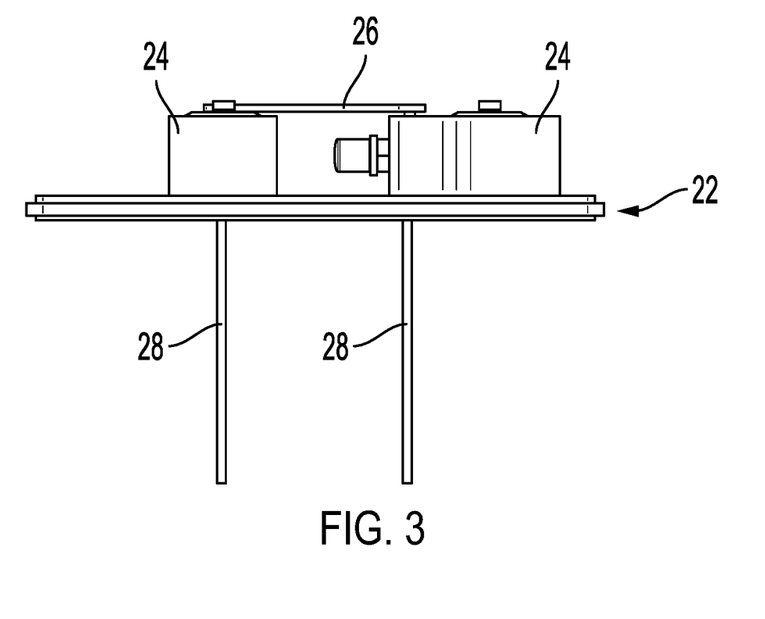
FIG. 3 is a side elevational view of the assembled apparatus of FIG. 2.

Turning to FIGS. 2 and 3 now, the apparatus 70 generally comprises a vacuum plenum portion 22 and elements 24 to generate a vibration, which are carried or mounted on the plenum portion 22, which forms a base for the apparatus. A handle 26 may be used to place the apparatus on the top surface of or inside the build supply material bin 12, and remove it when finished with compaction. The vibration elements 24 here are vibrators, such as eccentric rotating mass vibration motors (ERM) or linear resonant actuator motors (LRA), which are supplied by Cleveland Vibrators. ERM motors are DC motors with an offset (non-symmetric) mass attached to the shaft. As the ERM rotates, the centripetal force of the offset mass is asymmetric, resulting in a net centrifugal force, and this causes a displacement of the motor. With a high number of revolutions per minute, the motor is constantly being displaced and moved by these asymmetric forces. It is this repeated displacement that is perceived as a vibration. LRA motors use magnetic fields and electrical currents to create a force. These exemplary motors 24 are pneumatically driven, but other kinds of vibration inducing elements can be considered, in type as well as in the number that may be used.

Vibration elements 24 have vibrating pins 28 associated therewith. These pins 28 extend through the plenum portion 22, through apertures 30, and in use will extend into the powder of the supply bin. The vibration elements 24 cause the pins 28 to vibrate, thereby agitating or vibrating the powder, causing the powder to compact beneath the apparatus 20.

Figure 4:
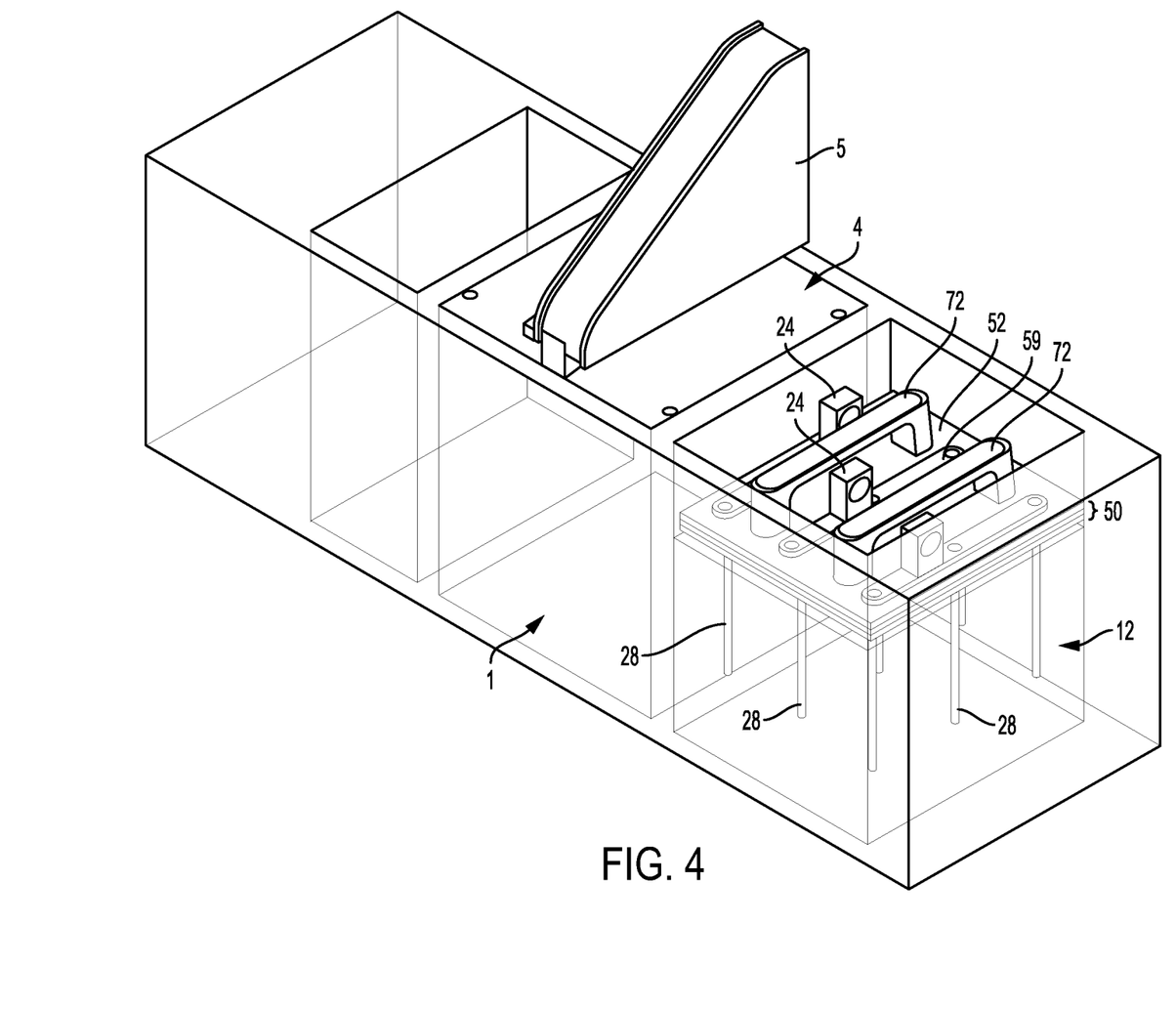
FIG. 4 is a view showing the apparatus of as it would be used in a build powder supply bin.
Figure 5:
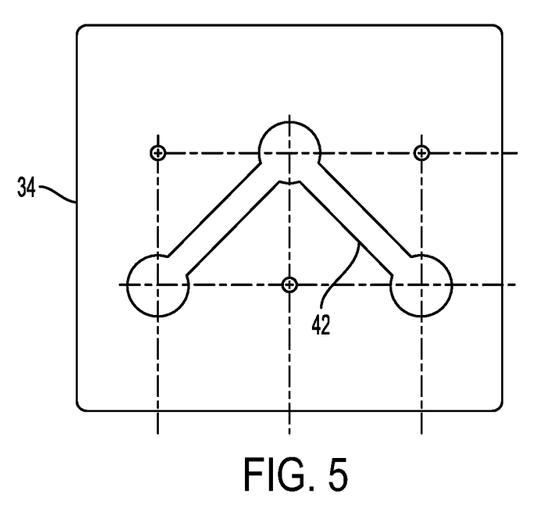
FIG. 5 is a plan view of a mid plate used with the embodiment of FIG. 1.
Figure 6:
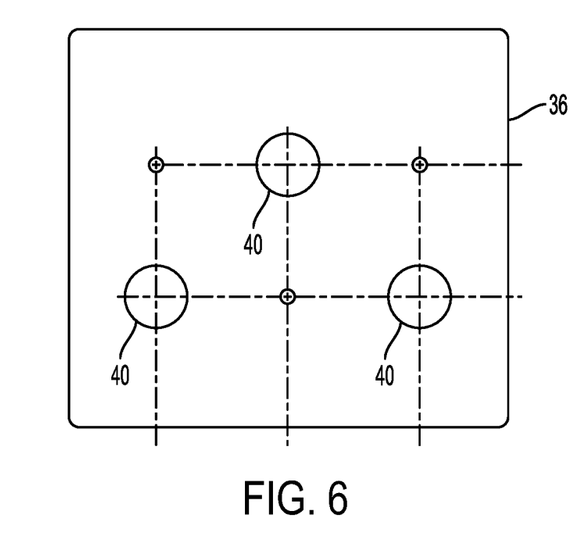
FIG. 6 is a plan view of a bottom plate used with the embodiment of FIG. 1.

The plenum portion 22 has a top plate 32, and in this embodiment a mid plate 34 and bottom plate 36. A seal 38 surrounds the plates. As will be seen with reference to FIGS. 5 and 6, the bottom plate 36 has openings 40 formed therein, which can be open to the top surface of the powder supply bin. The mid plate 34 has a channel structure 42 formed therein which will interconnect with the bottom plate openings 40. Top plate 32 (FIG. 2) has an opening 44 therein, which overlies the channel structure 42, and thus communicates with the holes or openings 40 in the bottom plate 36. A vacuum or similar suction source can then be attached to the top plate opening 44, to exhaust gases in the use of the apparatus, as build material becomes compacted, and to further assist in compaction itself. A mesh layer 46 (shown in FIG. 2 removed from the sandwich) overlies the channel 42 in the sandwich formed by the three plates, and serves to prevent powder from being drawn into the plenum portion 22 by the vacuum/suction. FIG. 4 shows the assembled apparatus as it would be installed in a supply bin in use.

Turning now to FIGS. 7 through 12, a second embodiment is illustrated. Apparatus 50 generally comprises a top plate 52, bottom plate 56, with an intermediate gasket or seal 58 therebetween. Vibration elements 24 are once again employed here. However, the pins 28 are now associated with pin carriers 59, to which the vibrators 24 are associated. The pins are connected to the carriers via screws, rivets or bolts or the like 60.

Figure 7:
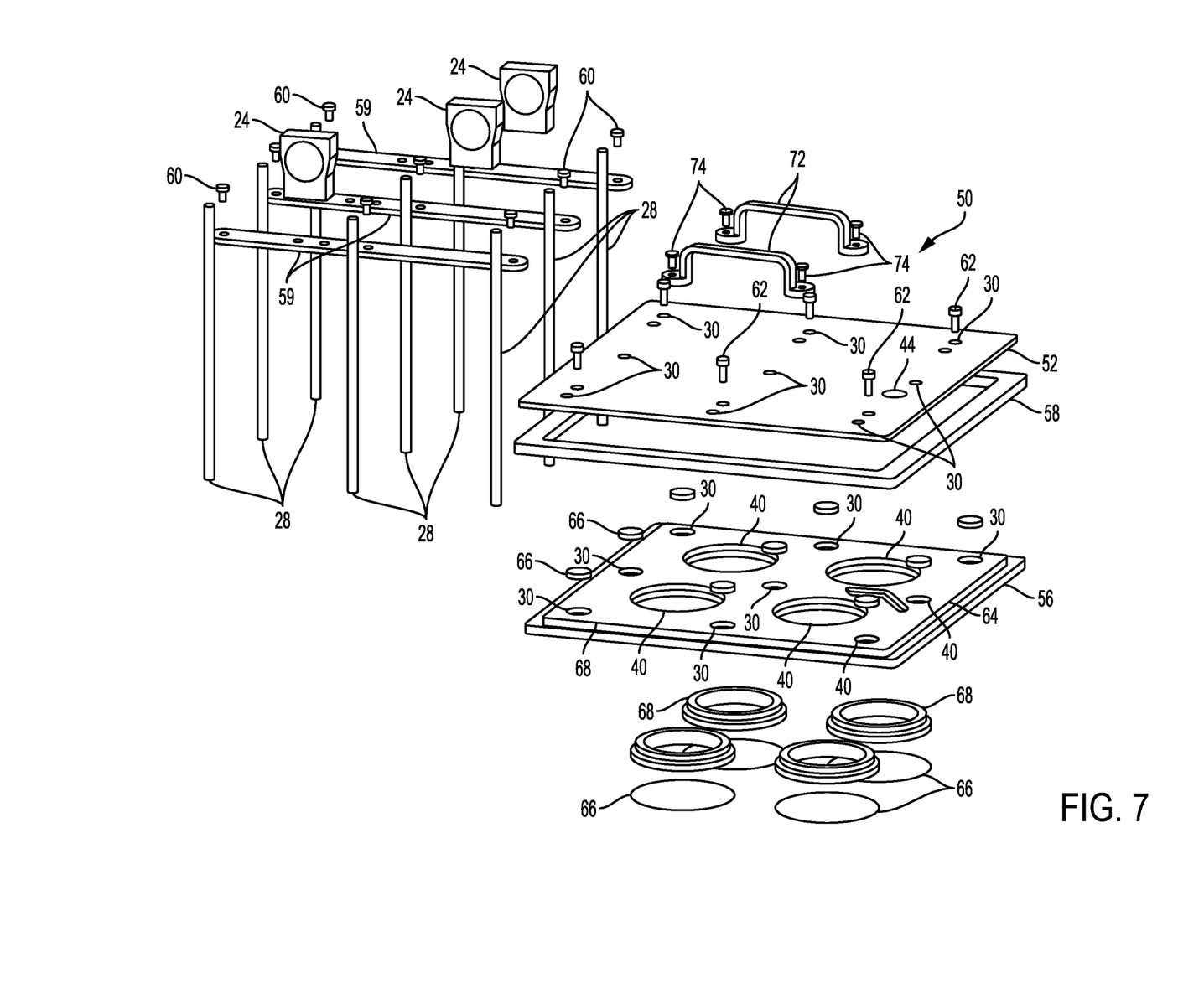
FIG. 7 is a somewhat exploded perspective view of another embodiment of the disclosure.
Figure 8:
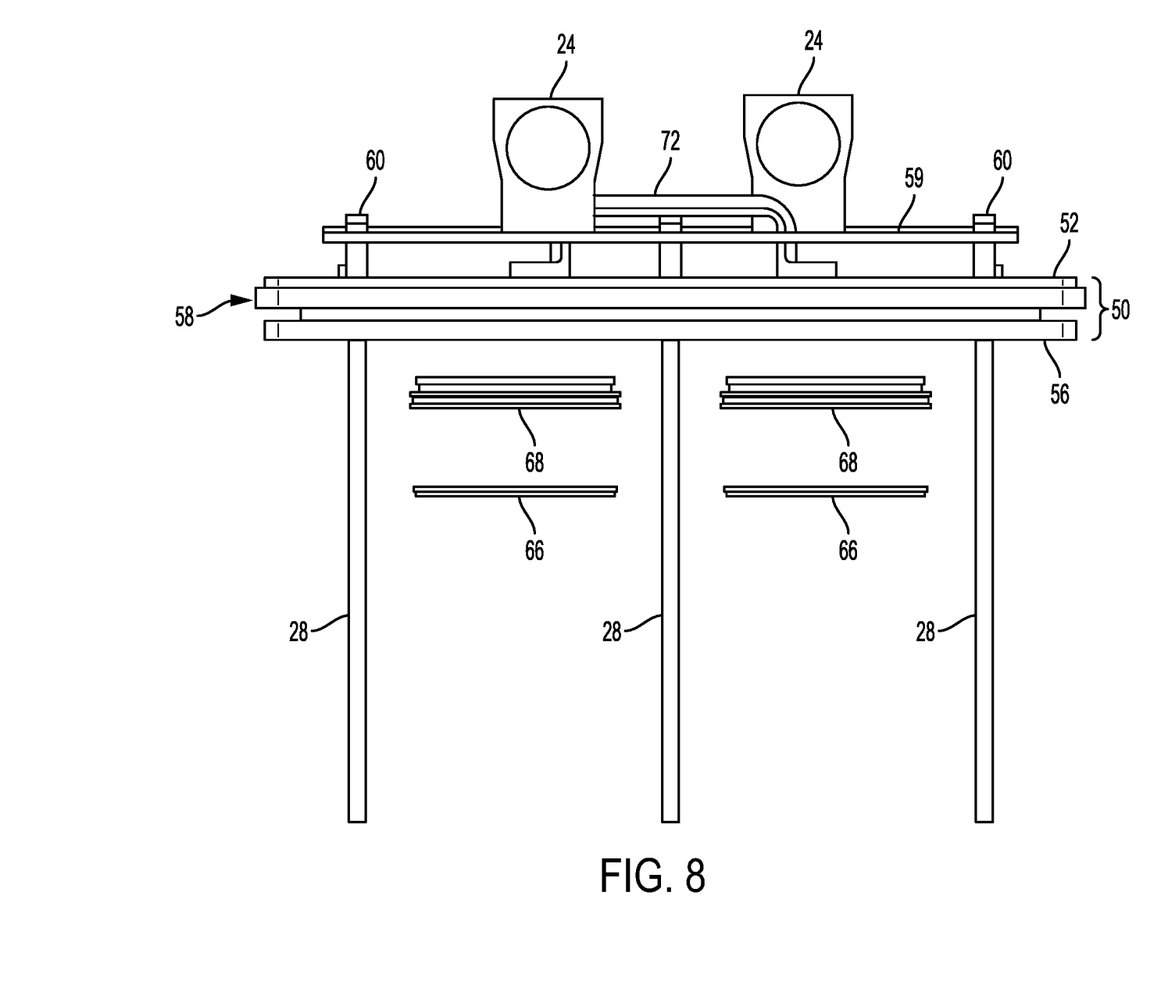
FIG. 8 is an elevational view in somewhat exploded form of the embodiment of FIG. 7.
Figure 9:
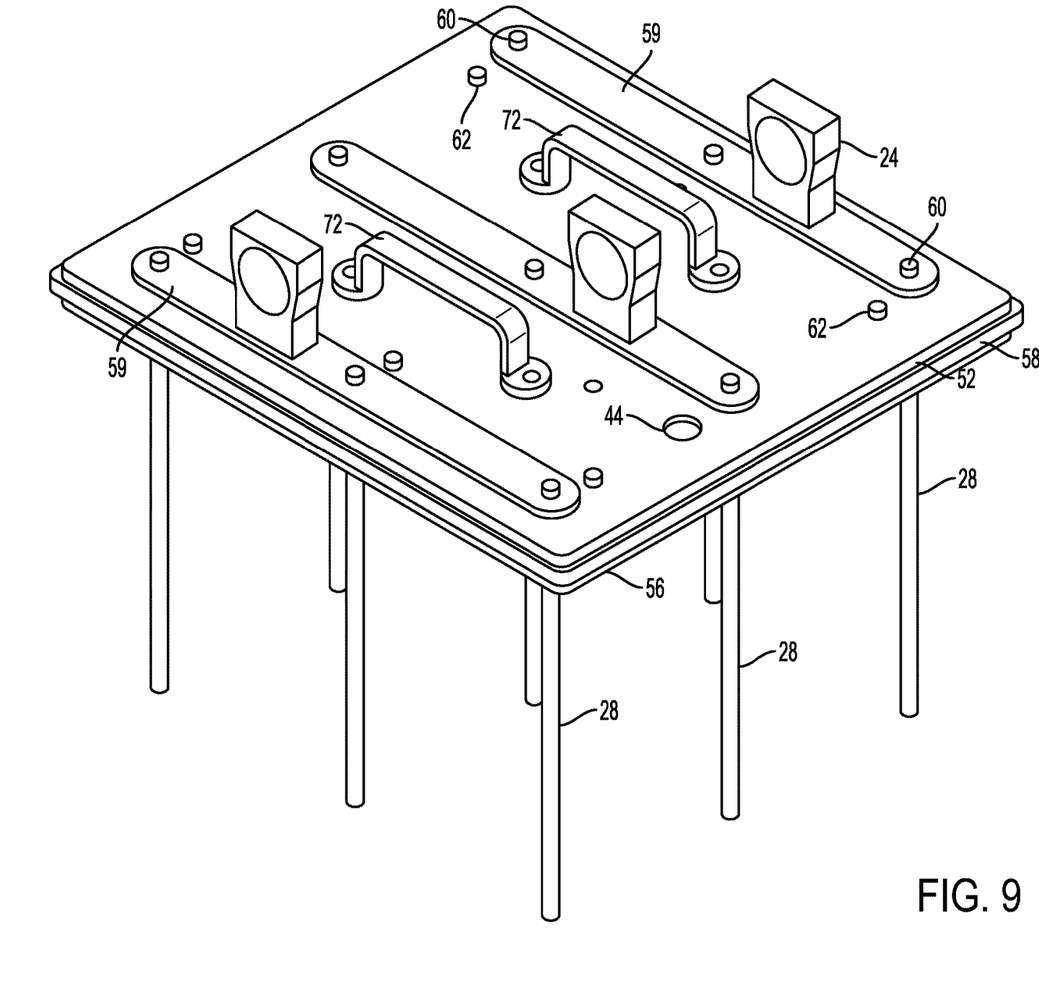
FIG. 9 is a perspective view of the assembled embodiment of FIG. 7.
Figure 10:
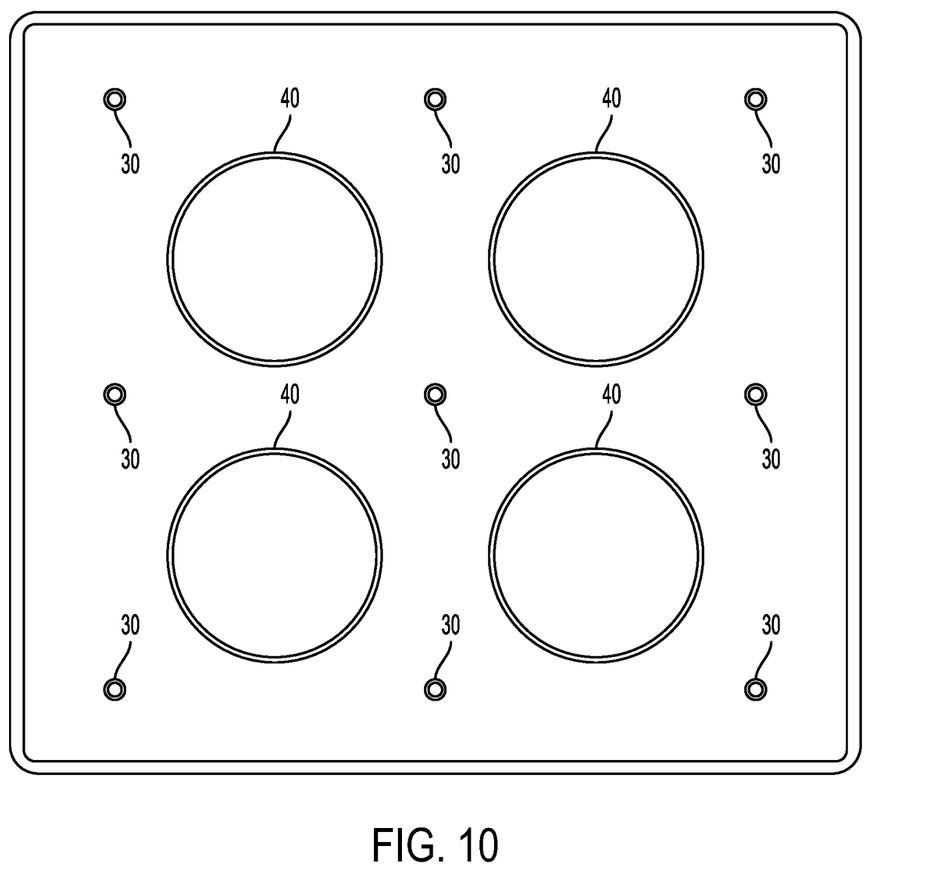
FIG. 10 is a plan view of the bottom plate of the embodiment of FIG. 7.

The pins 28 extend through apertures 30 formed in the top and bottom plates 52, 56. The plates 52, 56 are joined via screws, rivets, or bolts or the like 62 extending through apertures in the plates, with the gasket 58 held therebetween in a channel 64 around the perimeter. Note the additional use of washers or O-rings 66 located in wells 68 around the apertures 30.

Figure 11:
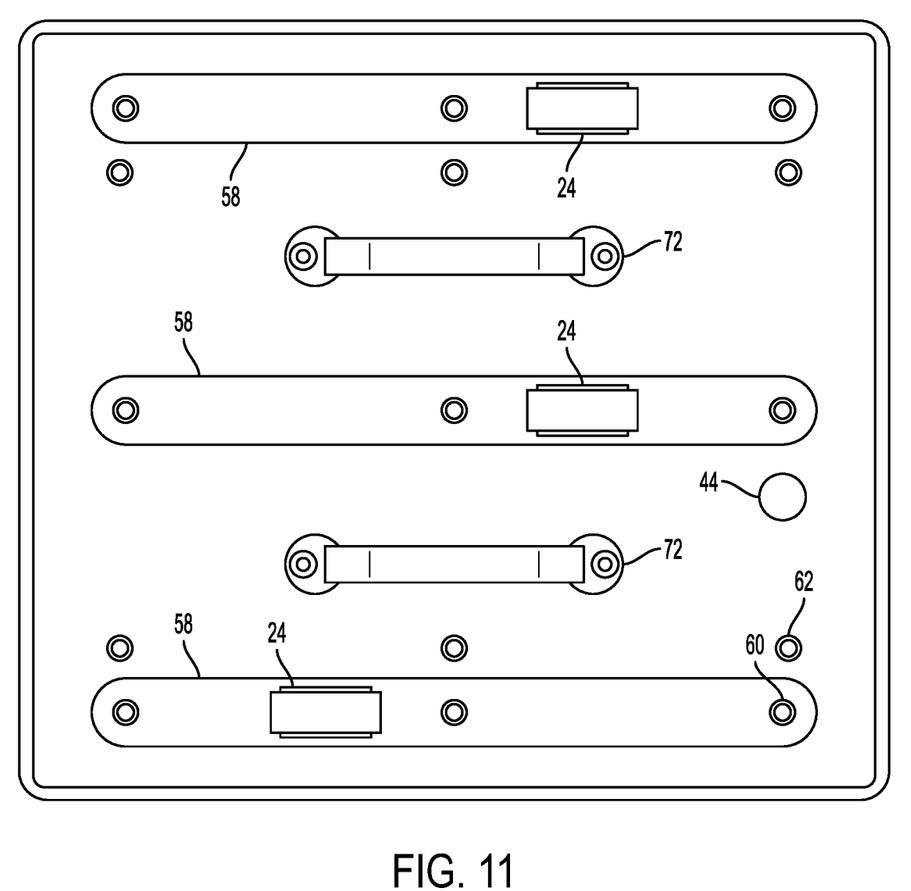
FIG. 11 is a plan view of the top plate of the embodiment of FIG. 7.
Figure 12:
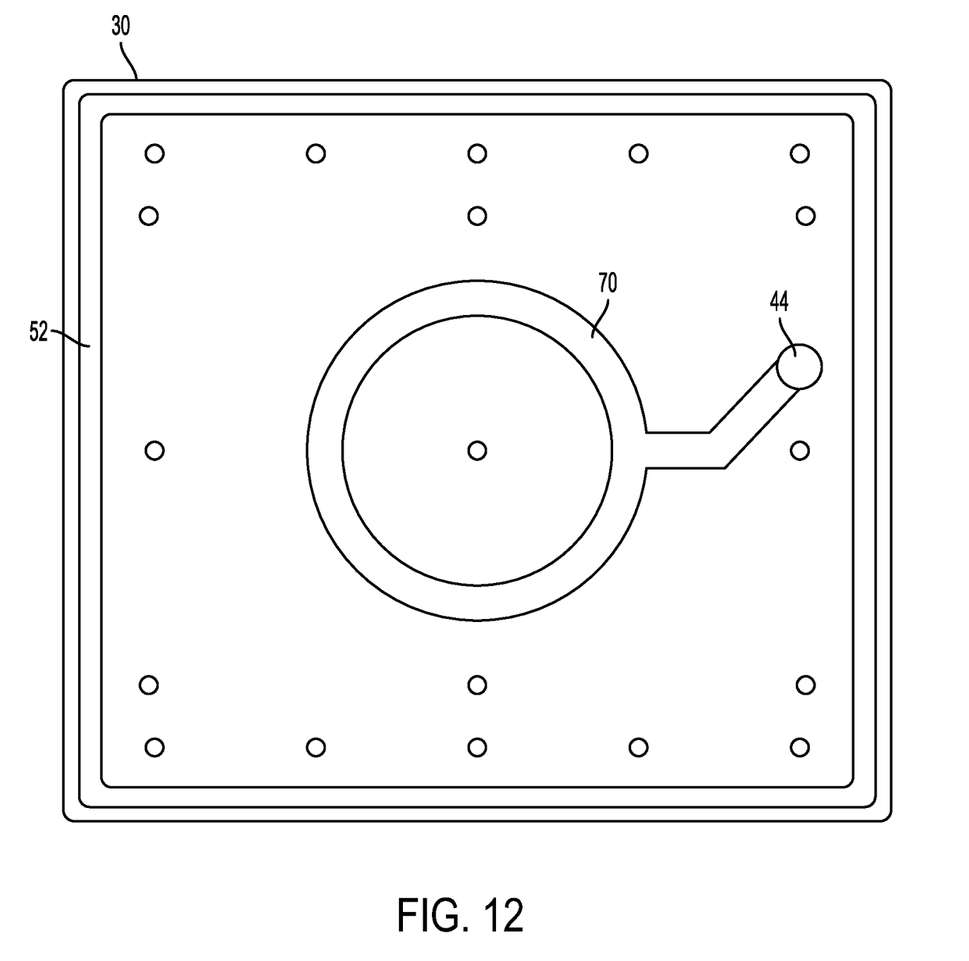
FIG. 12 is a plan view of the interior bottom of the top plate of the embodiment of FIG. 7.

Top plate 52 has a vacuum attachment opening 44, which now communicates with an internal plenum having openings 40, which will overlie the supply bin powder in use. Openings 40 are covered by mesh disks 66, held in place by rings 68. The rings 68 may be threadably engaged within the openings 40, so as to provide removability of the mesh disks 66 for cleaning or replacement. A channel 70 is formed in the bottom (inside facing) of the top plate 52, which communicates with the openings 40 in the bottom plate 56.

Handles 72 are provided and secured to the plate assembly using screws, rivets, or bolts or the like 74, to enable manual placement and removal of the apparatus 50.

Thus, while the invention has been described in relation to particular embodiments, the matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in claims as allowed, when viewed in their proper perspective based on the prior art.

It may also be noted that although claims only refer to one other claim, any features of any claim (unless logically or technically without sense) may be combined with any other claim than the one referred to. Features of apparatus claims may also be combined with features of method claims or the other way round.

What is claimed is:

1. A portable powder compactor for densifying a powder in a supply bin of an additive manufacturing system using powder bed fusion in a build chamber to build an object, the compactor comprising:
   a portable base, the base having a bottom that is sized to encompass an area that is smaller than a surface area of a powder surface in the supply bin upon which the base is placed to rest in use, the base and the compactor being removably emplaced manually on the powder surface by carrying the compactor, and then removed from the supply bin and from the system prior to operation of the system to build the object;
   a plurality of vibration elements carried by the base that transmit a vibratory motion upon activation;
   a plenum portion formed in the base through which a suction is generated through the plenum to the powder surface under the base with the compactor emplaced on the powder surface;
   at least one elongated pin connected to each of the vibration elements and mounted on the base with a length of the pin extending into powder beneath the base when the powder compactor is placed on the powder surface, each pin being moved by a respective vibration element to thereby vibrate within the powder to cause the powder to thereby become more compact and densified; and
   a source of suction attachable to the plenum portion which removes gases in the compaction process through the powder surface beneath the base.

2. The compactor of claim 1, further comprising a vacuum pump as the source of suction for removal of gas that is emitted from the powder during a compaction process of the powder.

3. The compactor of claim 1, further comprising a handle on the base adapted to be grasped and held for manual movement of the compactor.

4. The compactor of claim 1, wherein the plenum portion is formed between at least two plates comprising the base, with at least a top plate and a bottom plate.

5. The compactor of claim 4, wherein the bottom plate includes a bottom plate opening communicating with the plenum, and a mesh material which covers the bottom plate opening to prevent powder from passing into the plenum.

6. The compactor of claim 5, wherein a plurality of elongated pins are provided and are elongated along a length that is inserted into the powder.

7. The compactor of claim 4, further comprising a seal surrounding the plenum portion.

8. A portable powder compactor for densifying a powder in a supply bin of an additive manufacturing system using powder bed fusion in a build chamber to build an object, the compactor comprising:
   a portable base, the base presenting a bottom side which is planer so as to rest upon a powder surface area with the bottom being sized to encompass an area below the bottom that is smaller than the surface area of the powder surface in the supply bin, the base and the compactor being removably emplaced manually on the powder surface, and then removed from the supply bin and from the system prior to operation of the system to build the object;
   a plenum portion formed in the base through which a suction is generated through the plenum to the powder surface under the base with the compactor emplaced on the powder surface;
   a source of suction attachable to the plenum portion which removes gases in the compaction process through the powder surface beneath the base;
   a plurality of elongated pins mounted on the base so as to extend through the base into powder beneath the base when the powder compactor is placed on the powder surface, the plurality of pins being spaced apart over the area of the base bottom side;
   at least one vibration generating element carried by the base that transmit a vibratory motion upon activation to one or more pins, each pin being moved by a vibration generating element to thereby vibrate within the pin when the base is emplaced on the powder surface with the pins penetrating the powder to cause the powder to thereby become more compact and densified.

9. The compactor of claim 8, wherein pins are ganged together in multiple groups by a bar engaging pins in a group, with a vibration generating element engaging with a respective bar to thereby vibrate all of the pins in a group.

10. The compactor of claim 8, further comprising a handle on the base for manual movement of the compactor.

11. The compactor of claim 10, wherein the plenum portion is formed between two plates comprising the base, with a top plate and a bottom plate.

12. The compactor of claim 11, wherein the bottom plate includes a bottom plate opening communicating with the plenum, and a mesh material which covers the bottom plate opening to prevent powder from passing into the plenum.

* * * * *